United States Patent
Krause et al.

(10) Patent No.: US 12,392,899 B2
(45) Date of Patent: Aug. 19, 2025

(54) DEVICE AND METHOD FOR DETECTING THE SURROUNDINGS OF A VEHICLE

(71) Applicants: VOLKSWAGEN AKTIENGESELLSCHAFT, Wolfsburg (DE); AUDI AKTIENGESELLSCHAFT, Ingolstadt (DE)

(72) Inventors: Thilo Krause, Glinde (DE); Markus Heidrich, Bad Abbach (DE); Timo Iken, Wolfsburg (DE)

(73) Assignees: VOLKSWAGEN AKTIENGESELLSCHAFT, Wolfsburg (DE); AUDI AKTIENGESELLSCHAFT, Ingolstadt (DE)

( * ) Notice: Subject to any disclaimer, the term of this patent is extended or adjusted under 35 U.S.C. 154(b) by 6 days.

(21) Appl. No.: 18/010,942

(22) PCT Filed: Jun. 23, 2021

(86) PCT No.: PCT/EP2021/067156
§ 371 (c)(1),
(2) Date: Dec. 16, 2022

(87) PCT Pub. No.: WO2022/002719
PCT Pub. Date: Jan. 6, 2022

(65) Prior Publication Data
US 2023/0236320 A1    Jul. 27, 2023

(30) Foreign Application Priority Data
Jun. 29, 2020   (DE) ............... 10 2020 117 060.2

(51) Int. Cl.
*G01S 17/46*     (2006.01)
*G01B 11/25*     (2006.01)
(Continued)

(52) U.S. Cl.
CPC ............. *G01S 17/46* (2013.01); *G01B 11/25* (2013.01); *G01S 17/89* (2013.01); *G01S 17/931* (2020.01);
(Continued)

(58) Field of Classification Search
None
See application file for complete search history.

(56) References Cited

U.S. PATENT DOCUMENTS

| 10,586,351 B1 * | 3/2020 | Brailovskiy | ............ G06T 7/90 |
| 11,073,379 B2 * | 7/2021 | Heinrich | ............ H04N 13/239 |

(Continued)

FOREIGN PATENT DOCUMENTS

| DE | 10 2011 017707 A1 | 10/2012 |
| DE | 10 2016 223671 A1 | 5/2018 |

(Continued)

OTHER PUBLICATIONS

International Search Report for International Patent Application No. PCT/EP2021/067156, mailed Sep. 29, 2021.

*Primary Examiner* — Mohammad J Rahman
(74) *Attorney, Agent, or Firm* — PEARL COHEN ZEDEK LATZER BARATZ LLP

(57) ABSTRACT

A device for detecting the surroundings of a vehicle and a method for detecting the surroundings, and a vehicle designed to carry out said method comprise a camera module, a camera control apparatus, an analysis unit and an illumination device. The illumination device is formed by a matrix headlight of the vehicle and is designed such that it can project a light pattern into the surroundings. The projected light pattern is imaged in the detection region of the camera module and the 3D position of measurement points formed by the light pattern in the surroundings is determined by the analysis unit. However, the illumination device (Continued)

projects the light pattern only into regions of the surroundings in which the analysis unit has ascertained, based on image data, a value that is critical for 3D position determination.

9 Claims, 2 Drawing Sheets

(51) Int. Cl.
G01S 17/89 (2020.01)
G01S 17/931 (2020.01)
G06T 7/521 (2017.01)
G06T 7/593 (2017.01)
G06T 7/73 (2017.01)
H04N 13/239 (2018.01)
H04N 13/254 (2018.01)
H04N 13/00 (2018.01)

(52) U.S. Cl.
CPC .............. *G06T 7/521* (2017.01); *G06T 7/593* (2017.01); *G06T 7/73* (2017.01); *H04N 13/239* (2018.05); *H04N 13/254* (2018.05); G06T 2207/30252 (2013.01); H04N 2013/0081 (2013.01)

(56) References Cited

U.S. PATENT DOCUMENTS

| | | | |
|---|---|---|---|
| 2012/0275173 A1* | 11/2012 | Hamm | F21S 41/24 362/487 |
| 2016/0016504 A1* | 1/2016 | Licsar | B60Q 1/085 701/49 |
| 2016/0215962 A1* | 7/2016 | Chien | F21V 29/70 |
| 2017/0158128 A1* | 6/2017 | Jiang | B60Q 9/008 |
| 2017/0186166 A1 | 6/2017 | Grunnet-Jepsen et al. | |
| 2018/0275278 A1 | 9/2018 | Yamada | |
| 2019/0344702 A1 | 11/2019 | Breuer et al. | |
| 2020/0148094 A1* | 5/2020 | Boehm | H05B 47/125 |
| 2020/0186751 A1* | 6/2020 | Tran | H04N 5/2628 |
| 2020/0302626 A1* | 9/2020 | Ikeoh | G06T 7/521 |
| 2020/0348127 A1 | 11/2020 | Heinrich et al. | |

FOREIGN PATENT DOCUMENTS

| | | |
|---|---|---|
| DE | 10 2017 117614 A1 | 2/2019 |
| DE | 10 2017 222708 A1 | 6/2019 |

* cited by examiner

DEVICE AND METHOD FOR DETECTING THE SURROUNDINGS OF A VEHICLE

CROSS-REFERENCE TO RELATED APPLICATIONS

This application is a National Phase Application of PCT International Application No. PCT/EP2021/067156, International Filing Date Jun. 23, 2021, claiming the priority of German Patent Application No. 10 2020 117 060.2, filed Jun. 29, 2020, which is hereby incorporated by reference.

FIELD OF THE INVENTION

The invention relates to a device for detecting the surroundings of a vehicle. The invention also relates to a method for detecting the surroundings by means of a structure-imparting camera module, and it also relates to a vehicle designed to carry out said method.

BACKGROUND OF THE INVENTION

Ever more vehicles, especially passenger cars, are equipped with driver-assistance systems that assist a driver or that (partially) autonomously influence the driving dynamics of the vehicle. Today's driver-assistance systems, especially for motor vehicles, are designed to be able to respond dynamically to the surroundings of the vehicle in traffic. In particular, the ability to evaluate the road ahead of time calls for means that can determine the geometric and dynamic properties such as, for instance, the spatial distance between certain objects in the surroundings and the motor vehicle. Consequently, such driver-assistance systems that influence the longitudinal and lateral guidance require a valid model of the surroundings in order to effectuate safe navigation. This information is made available in vehicles especially by means of radar sensors, lidar sensors and camera sensors.

All of these sensors have specific properties and features that promote the use of a given modality for certain application cases or else that limit their suitability. Depending on the application case, two-dimensional measurements of the position or else measurements of the speed of objects in the surroundings are sufficient. In applications where a precise navigation is required, for example, in the case of (partially) automated driving, a 3D sensor is advantageous. In this manner, structures in three-dimensional space can be imaged and robust, collision-free navigation can be ensured.

Laser scanners, stereo cameras and mono cameras are used to survey measure objects and surrounding structures with so-called "Structure-from-motion" algorithms (SfM). Development work is likewise being done on reconstruction algorithms on the basis of neuronal networks that can be applied to mono or stereo camera images.

Laser scanner methods are known in which a laser light pattern emitted by a laser beam source is analyzed by means of a triangulation method. For this purpose, if infrared lasers are used, an employed camera has to be sensitive to infrared, but this distorts the color perception in the visible range of the spectrum, or else the laser light patterns have to be in the visible range of the spectrum, but this can be disturbing in road traffic. Moreover, laser scanners are still very cost-intensive because of their complex technology.

In the case of stereo cameras that are used for the 3D detection of the surroundings, the image information between the camera images is correlated so as to compute the distance information. In order to make use of this technology, stereo cameras require a texture of the object that is to be detected. Under favorable light conditions, there is usually enough texture information available in the video images to determine depth information. Therefore, when it comes to stereo image processing, daylight is usually sufficient for the correlation analysis. Texture information can essentially be acquired from contrast differences along the edges of objects. Under poor light conditions, for example, at night, however, stereo methods quickly reach their limits, in spite of vehicle illumination.

More and more modern vehicles have LED headlights. In high-end models, these are configured as so-called matrix LED headlights. The construction of these matrix headlights, especially thanks to their individually actuatable pixels, allows them to project patterns onto the roadway and onto the objects in the surroundings.

SUMMARY OF THE INVENTION

The objective of the invention is to overcome the drawbacks of the state of the art and to put forward a method and a vehicle that allow a simplified and improved three-dimensional detection of the surroundings, especially of unstructured surfaces. The objective is achieved by a device, a method and a vehicle according to the main claims. Preferred embodiments of the invention can be gleaned from the appertaining subordinate claims that refer back to the main claims as well as from the accompanying description.

A first aspect of the present invention relates to a device for detecting the surroundings for a vehicle, especially a structure-imparting camera sensor, comprising at least one camera module, a camera control apparatus, an analysis unit and an illumination device. The illumination device is formed by a matrix headlight of the vehicle, and it is designed to project a light pattern into the surroundings, said light pattern varying with the distance from the illumination device. The at least one camera module is configured to image at least part of the light pattern that is projected into the surroundings. The analysis unit is designed to determine a 3D position on the basis of image data that has been acquired by the camera module. Moreover, the analysis unit is designed to determine surrounding regions on the basis of values that are critical for determining the 3D position. Furthermore, the illumination device is configured to project the light pattern only into the critical surrounding regions that have been determined by the analysis unit, and moreover, the analysis unit is configured to determine a 3D position of measurement points formed by the light pattern in the surroundings on the basis of image data that has been acquired by the at least one camera module.

The invention has the advantage that reliable three-dimensional images are generated which cover the entire surface area. Here, the device is designed in such a way that—depending on critical values of the observed scene—objects and image regions having, for instance, a contrast that yields unusable 3D image data, are provided with an additional structure or texture, thereby selectively improving or, in fact, even bringing about the three-dimensional recognition of partial areas. The camera module uses an image sensor to acquire two-dimensional image data and, on this basis, the analysis unit computes three-dimensional images in a generally known manner. Within the scope of a driver-assistance system, object recognition and object classification can serve to carry out risk assessments and to make recommendations or to directly influence the driving dynamics of the vehicle.

The structured illumination that is provided by the light pattern makes it possible to produce surface-covering, reliable distance information. The analysis unit examines the image data with respect to prescribed criteria that are relevant for determining the three-dimensional position. Thanks to the additional structured illumination, for example, contrast-free or repetitive image regions that do not actually meet the criteria are also imparted with a sufficiently distinguishable contrast, as a result of which the illumination device ensures that reliable correspondences can be found, even in those areas without a natural structure. Thus, for example, in structured surroundings such as parking garages, there are often not enough textures of the surfaces. In particular, homogeneous road surfaces or monochromatic smooth walls, which pose difficulties for the 3D detection of the surroundings by stereo cameras, can also be detected according to the invention.

A permanent static light pattern that exposes the entire scene, however, can also entail drawbacks; for instance, the superimposition of the light pattern with the natural texture of the scene can cause areas to be overexposed or can cause the desired contrast improvement to be once again lost in its entirety. Consequently, there might be an impairment of the quality and reliability of the distance information because of deteriorations in the contrast or unambiguity. This drawback is avoided by the present invention in that a light pattern is only projected into areas in which the analysis unit has identified a critical region on the basis of the detected image data. This diminishes the analysis work as well as the power required for the illumination device. In this context, it is preferable for contrast values to be used as the critical values. It is likewise preferable to analyze the density of measurement points that are formed, for example, by the texture with an eye towards a limit value. It is likewise preferable for a speed value or a rapidly changing distance value of a surrounding region to function as a critical value. Thus, when rapidly approaching objects exceed a critical speed value or distance, they can be impinged with a light pattern so that their three-dimensional recognition is improved. Also preferably, a critical region can be determined through object identification and/or object classification carried out by the analysis unit on the basis of image data. Thus, it is preferable for certain recognized object classes to count as a critical value in the sense of the invention. Therefore, it is especially preferable for object classes that comprise living beings such as people and animals to be impinged with a light pattern. For example, at night, if even the illumination of the surroundings with the vehicle headlights produces image data in which the natural contrast and/or the texture produce critical values, then the entire surrounding region that is detected by the camera module counts as a critical surrounding region and is preferably impinged with a light pattern.

The term measurement points formed by the light pattern includes not only punctiform or circular light points as elements of the light pattern, but also flat surface areas that can be illuminated by the illumination device with varying intensities. Thus, holes, that is to say, darkened areas, are also included in the concept of measurement points. The measurement points of the light pattern can also have all kinds of geometric shapes and can constitute lines as well. Moreover, the measurement points can be determined regularly or else uncorrelated or irregularly, but by means of the analysis unit. In order to be able to generate such a light pattern, the illumination device is formed by a matrix headlight whose individual pixels can be precisely actuated in terms of brightness and direction. Since the headlights of the vehicle are used as the illumination device, no additional light source has to be installed and the rigid installation defines a fixed position relative to the camera module, which facilitates the calibration of the entire device. Consequently, components present in the vehicle are utilized and combined in order to increase the robustness and precision of the observation of the surroundings of the vehicle, without having to use additional components.

Additional preferred embodiments of the invention can be gleaned from the other features put forward in the subordinate claims. In particular, it is preferred for the illumination device to have a switchable LED or laser diode array. It has to be possible to quickly switch the illumination device over, especially so quickly that a generally uniform light distribution of a conventional front headlight appears to the driver. This is preferably achieved in that the light pattern is preferably not formed by brightness differences but rather by frequency differences of the light. This is why switchable semiconductor arrays with a plurality of LEDs or by laser diodes are very well suited. Here, each pixel is preferably formed by an LED or laser diode, or else an individually actuatable and switchable micro-mirror array is illuminated by a lens. Possible front headlights include matrix LED headlights as well as matrix leaser headlights, but the latter are not yet being used in the general mass market because of their high cost. Furthermore, it is preferable for the control unit to synchronize the camera module and illumination device in such a way that projected light patterns are associated with an image acquired by the camera module and, in addition or as an alternative, the light pattern projection is only regulated during the time while the aperture of the camera module is open.

In a preferred embodiment of the invention, it is provided for the camera module to comprise a stereo camera. For this purpose, the camera module has two image sensors whose perspective is offset and at a fixed distance with respect to each other, and the analysis unit uses a stereo algorithm for one of the appertaining partial areas of the image data acquired by the image sensors to compute the distance information, as a rule, by means of a triangulation method.

According to the invention, it is provided for the illumination device to be designed to project a light pattern that varies with the distance from the illumination device. In this manner, the distance of an object can be determined not only by detecting and computing the distortion of a pattern and its individual pattern elements, for example, by means of triangulation, but in fact, the pattern itself is variable and it forms a distance indicator that can be easily ascertained by the analysis unit if a reference pattern sequence is known to the analysis unit. In this way, the computing work and the computing time for determining the distance data are once again markedly reduced.

Furthermore, it is preferable for the illumination device to be designed to project a light pattern, whereby the shape of individual measurement points of the light pattern varies with the distance from the illumination device. This provides the analysis with another simple distance indicator so as to reduce the computing work and the computing time, and this can replace the correlation algorithm so as to create a first quick depth image that can then be further refined with correlation algorithms as the need arises.

The subject matter of the invention is also a method for the spatial detection of the surroundings of a vehicle by means of at least one camera module, a camera control apparatus, an analysis unit and an illumination device, whereby the illumination device, which is formed by a matrix headlight of the vehicle, projects a light pattern into the surroundings of the vehicle. Here, at least part of the projected light pattern is imaged by the at least one camera module. The analysis unit determines a 3D position on the basis of image data from the at least one camera module and surrounding regions are determined on the basis of values that are critical for determining the 3D position. The illumination device projects the light pattern into the critical surrounding regions that have been determined by the analysis unit, and the analysis unit determines a 3D position of measurement points formed by the light pattern in the surroundings using image data that has been acquired by the at least one camera module.

The method is especially suitable to be implemented in the form of software on a control unit of the vehicle or on multiple control units or on the analysis unit of the camera module. The method allows a distance measurement on untextured surfaces. Owing to the merely situational projection of the light pattern in areas with a low measurement point density, distance information can also be generated for otherwise uniform non-contrasting surfaces. At the same time, the requisite measuring and processing effort is reduced, since normally, the visible structures in the video images are used for the distance measurement.

It is also preferred for the light pattern to be projected in such a way that the light pattern varies with the distance from the illumination device, and it is also preferred for a light pattern to be projected in which the shape of individual pattern elements varies with the distance from the illumination device. Furthermore, it is preferred for the light pattern to be projected so briefly that the driver perceives a uniform light distribution of a conventional front headlight. As a result, it is possible for the sensory impression of the driver or of another road user to consist only of the entire surface area of the illumination. Moreover, this can prevent the projected light pattern from interfering with other detection sensors.

The various embodiments of the invention put forward in this application, if not indicated otherwise in an individual case, can advantageously be combined with each other.

BRIEF DESCRIPTION OF THE DRAWINGS

The invention will be explained below in embodiments in conjunction with the associated drawings. The following is shown.

DETAILED DESCRIPTION OF THE INVENTION

Figure 1:
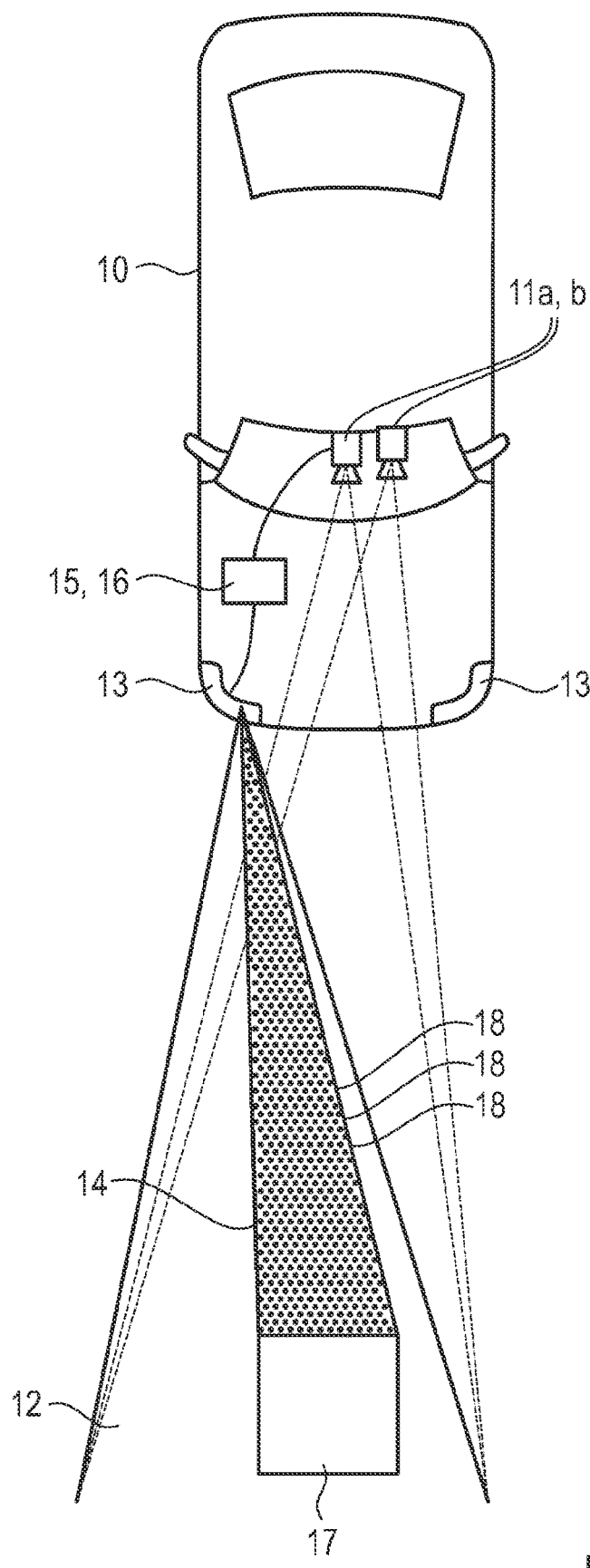
FIG. 1 is a schematic depiction of a vehicle with a device according to the invention for the three-dimensional detection of the surroundings by means of a stereo camera.

FIG. 1 is a schematic depiction of a vehicle 10 having a camera module 11 that faces in the driving direction and that is configured as a stereo camera. The camera module 11 is arranged, for example, in the area of the windshield of the vehicle 10. The camera module 11 is designed to acquire three-dimensional image data, also referred to as distance images or depth maps, of a surrounding region 12 of the vehicle 10.

In the embodiment shown here, the camera module 11 consists of two camera units 11a, 11b that are mounted at a known fixed distance from each other and that each acquire image data of the surrounding region 12. Each camera unit 11a,b comprises an image sensor, normally a matrix-type acquisition chip that acquires a rectangular pixel image, for example, a CCD or CMOS sensor. The image sensors are usually associated with an objective that has an imaging lens and that can be implemented in actual practice as any kind of generally known imaging lens. The two camera units 11a,b of the camera module 11, which is configured as a stereo camera, have an overlapping area 12 in which the detection areas of both camera units 11a,b overlap.

An illumination device 13 that is configured as a front headlight of the vehicle 10 and that has a light source and a transmission lens is shown. The illumination device 13 allows the real-time projection of a pixel-based, quantified structured light pattern 14 that is shown in simplified form as a dotted pattern. In practical terms, the light pattern 14 should preferably be at least locally unambiguous or self-dissimilar in the sense that structures of the light pattern 14 do not lead to spurious correlations or unambiguously characterize an illumination area.

The illumination device 13 is able to project a prescribed random pixel pattern as a structured light pattern 14 in real time via a camera control apparatus 15 that controls the camera module 11 and the illumination device 13. Such an adaptive dynamic illumination device 13 can be realized, for example, by using a micro-display with a light source in the form of one or more high-power LEDs or laser diodes, especially in an array. The illumination device 13 uses a switchable array of LEDs or laser diodes. Here, the individual light sources themselves form the pixels of the light pattern 14.

A combined analysis unit and control unit, hereinafter referred to simply as the analysis unit 16, is connected to the camera module 11 and to the illumination device 13. This analysis unit 16 can be integrated into the vehicle control device so that it can use the integrated vehicle electronics to access the vehicle headlights 13 and the camera module 11 as well as—via the driver-assistance system—also the driving electronic and mechanical systems. The analysis unit 16 prescribes the structured light pattern 14 and it receives image data from the image sensors. Based on this image data, the analysis unit 16 uses a generally known stereo algorithm to compute three-dimensional image data of the observed surrounding region 12. Via an output, the camera module 11 can output three-dimensional image data but also other measured results, for example, raw image data from the camera module 11, analysis results such as object data or the identification of certain objects 17.

The illumination device 13 and the camera module 11 should preferably undergo a calibration process to as to determine the precise association between illumination pixels and the detected image pixels. In the case of an integrated illumination device 13 as shown in FIG. 1, this is preferably already done at the factory.

According to the invention, it is provided for the projected light pattern 14 to be adapted to the surroundings 12. In a first step, the camera module 11, preferably as a passive stereo camera, continuously acquires surrounding data and uses this data to generate three-dimensional depth maps. This can take place, for example, without auxiliary illumination by the vehicle 10, but as a rule, it is done under homogenous illumination by the illumination device 13, for example, with daylight driving lights or, under poor natural light conditions, for example, at night or in a tunnel, by the low beams or high beams of the illumination device 13 of the vehicle 10.

Based on the detected image data from the image sensors as well as, if applicable, from a three-dimensional image generated in the stereo camera on the basis of this data, contrast information and, if applicable, distance information of the currently detected surrounding region 12 is computed. The analysis unit 16 can determine for image regions whether information for generating a relevant depth image is lacking, for example, because the natural texture that is formed by the edges of an object 17 or by the edges of a surface of an object 17 is insufficient, for example, if it lies below a critical value. The light pattern 14 to be projected can then ensure sufficient contrast at all of the relevant places so as to permit a reliable 3D detection. According to the invention, a light pattern 14 is applied only at the places with inadequate contrast conditions or unreliable distance values.

In the next step, the illumination device 13 projects the light pattern 14 that is to be projected into the surrounding region 12. Both of the two-dimensional initial images are acquired by the image sensors of the camera module 11 and the analysis unit computes them in order to form a three-dimensional image. The light pattern 14 can then be used in additional acquired images in order to detect the three-dimensional image. This makes it possible to adapt the light pattern 14 and the analysis of the image data to the situation in the surroundings. Thus, in certain situations, for example, when an object 17 is approaching or when an object 17 is being approached, part of the surroundings 12 is illuminated and analyzed with a greater structure than in other situations, for example, in the case of an unimpeded field of view. In particular, during (partial) driving automation, a targeted adaptation of the illumination, analysis and light pattern 14 can be achieved, for example, while driving around curves or relating to the driving speed of the vehicle 10.

Although the invention is carried out using the stereo camera shown in FIG. 1, other 3D cameras are also conceivable, especially those with only one high-resolution camera and with a projection method in which a shift of the image data point 18 results from a pattern distortion of the light pattern 14 that is correlated with the distance (active triangulation). Therefore, one camera unit can be dispensed with and the stereo camera is reconfigured accordingly to form a triangulation unit. However, the light pattern projection method can also be additionally implemented in the stereo camera, making use of one of the camera units 11a, b, whereby the camera control apparatus 15 and the analysis unit 16 are then configured for both methods.

Figure 2:
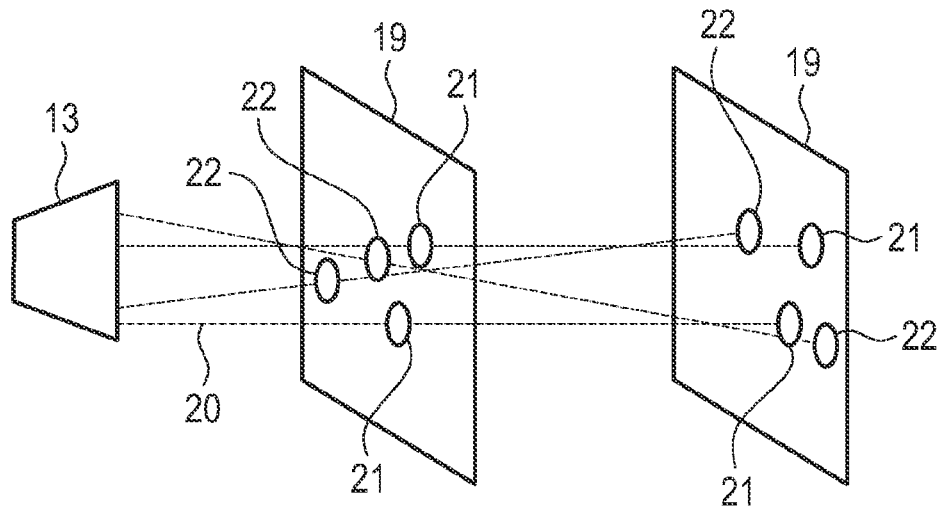
FIG. 2 is a schematic view of a projected light pattern according to the invention with a distance-dependent variable measurement point arrangement.

FIG. 2 schematically shows an example of the projection of a light pattern 14 in such a way that the light pattern 14 varies with the distance from the illumination device 13. Such a variability can be achieved, for example, in that a few of the individual actuatable illumination pixels, that is to say, for instance, switchable LEDs that can be varied in terms of brightness and beam direction, or else elements of a micromirror array that form the light pattern elements do not run in parallel to each other. Then, if a few reference elements are stored for the light pattern 14, the analysis unit 16 can simply deduce the distance of the surface on the basis of the changed distance of individual surface measurement points 18. This is also possible for otherwise identical unstructured smooth surfaces. Another possibility is to use projection lenses, especially microlenses. They can have different focal lengths so that the light pattern 14 that is projected into the surroundings 12 of the vehicle 10 varies with the distance.

This is namely the case since not all of the measurement points 18 then appear in different image planes 19 that are dependent on the distance. By way of example, individual beam paths 20 are shown, whereby they are formed by the projected light of the individual actuatable pixels of the pixel matrix headlight 13. These beam paths 20 intersect a first and a second image plane 19 where they form a measurement point 18. A first group 21 of measurement points 18 remains constant, irrespective of the distance, whereas a second group 22 of measurement points 18 is variable relative to the first group 21. Here, this is characterized by a different beam angle. In this context, the first group 21 of measurement points 18 forms a reference to which the analysis unit 16 determines the relative change of the second group 22.

Figure 3:
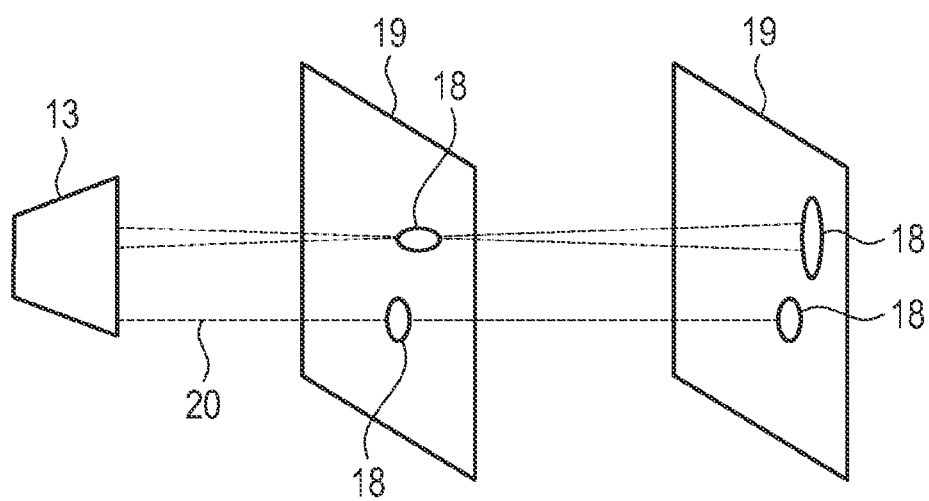
FIG. 3 is a schematic depiction of a projected light pattern according to the invention with distance-dependent variable measurement points.

It is also conceivable for a light pattern 14 to be projected in that the individual elements of the light pattern 14, that is to say, the measurement points 18, actually vary with the distance from the illumination device 13 as is schematically shown in FIG. 3. For example, microlenses can be used for this purpose, whereby a few or all of the microlenses have multiple different focal lengths, so that the measurement points 18 do not appear in all of the image planes 19. Astigmatic micro projection lenses can also be used as microlenses, causing the shape of the measurement points 19 to change. Thanks to this distance information, which can be analyzed relatively quickly, the computation work and the computation time can be additionally reduced since, for example, a two-stage 3D recognition can be used. Thus, for instance, a rough analysis can be initially made in this manner and, for example, once an area has been identified that is approaching at high speed, a more precise and more complex analysis can be carried out.

In principle, within the scope of the invention, various light patterns 14 can be used, but explicitly not limited to these such as, for example, line patterns, stripe patterns, dotted patterns, grid patterns, checkerboard patterns and/or pseudo-random patterns. In this case, pseudo-random means that the light pattern 14 is generated randomly, but it is known to the control unit of the pixel headlight 13 that carries out the emission and projection of the light pattern 14 and also to the camera control apparatus 15 or the analysis unit 16 of the camera module 11 that uses the light pattern 14 to recognize the surrounding-specific properties.

Preferably, a non-uniform uncorrelated light pattern 14 is used. This also includes, for instance, a quasi-periodical light pattern 14 that has sections that run in parallel in a first direction and that, in turn, contain patterns that are uncorrelated in a second direction. In that associate, an uncorrelated light pattern 14 means that the positions of the measurement points 18 are uncorrelated such that an autocorrelation of the pattern 14 becomes insignificant for a shift that is greater than the point size 18. This is particularly important for the use with stereo camera modules 11 so that the individual camera units 11a, b always analyze the same measurement points 18 of the light pattern 14 and do not compare an identical but shifted pattern section with each other, for example, as is the case with a regular pattern.

The invention claimed is:

1. A device for detecting a surroundings of a vehicle, said device comprising at least one camera module for acquiring image data from the surroundings, a camera control apparatus, an analysis unit and an illumination device, whereby the illumination device is formed by a matrix headlight of the vehicle and is designed to project a light pattern into the surroundings, said light pattern varying with the distance from the illumination device, the at least one camera module is configured to image at least part of the light pattern that is projected into the surroundings, the analysis unit is configured to determine a 3D position on the basis of image data with the projected light pattern from the at least one camera module, and the analysis unit is also configured to determine surrounding regions on the basis of values that are critical for determining the 3D position, wherein speed values and/or changing distance values are used for the critical values, the illumination device is configured to project the light pattern only into the critical surrounding regions that have been determined by the analysis unit, and the analysis unit is also configured to determine a 3D position of measurement points formed by the light pattern in the surroundings on the basis of image data that has been acquired by the at least one camera module, wherein the device is configured to adapt the light pattern and the analysis of the image data to the situation in the surroundings.

2. The device according to claim 1, wherein a critical value is formed by contrast values from the image data.

3. The device according to claim 1, wherein a critical value is formed by a limit value for the density of measurement points.

4. The device according to claim 1, wherein the illumination device has a switchable LED or laser diode array.

5. The device according to claim 1, wherein the camera module comprises a stereo camera.

6. The device according to claim 1, wherein the illumination device is configured to project a light pattern, whereby the shape of individual pattern elements varies with the distance from the illumination device.

7. A method for a spatial detection of a surroundings of a vehicle by means of at least one camera module for acquiring image data from the surroundings, a camera control apparatus, an analysis unit and an illumination device, whereby the illumination device, which is formed by a matrix headlight of the vehicle, projects a light pattern into the surroundings, said light pattern varying with the distance from the illumination device, whereby at least part of the projected light pattern is imaged by the at least one camera module, whereby the analysis unit determines a 3D position on the basis of image data with the projected light pattern from the at least one camera module, and the analysis unit determines surrounding regions on the basis of values that are critical for determining the 3D position, wherein speed values and/or changing distance values are used for the critical values, whereby the illumination device projects the light pattern only into the critical surrounding regions that have been determined by the analysis unit, and whereby the analysis unit determines a 3D position of measurement points formed by the light pattern in the surroundings using image data that has been acquired by the at least one camera module, wherein the analysis unit is configured to adapt the light pattern and the analysis of the image data to the situation in the surroundings.

8. The method according to claim 7, wherein the light pattern is projected so briefly that the driver perceives a uniform light distribution of a conventional front headlight.

9. A vehicle, having a device for detecting the surroundings according to claim 1.

* * * * *